US008745872B2

United States Patent
Hein et al.

(10) Patent No.: US 8,745,872 B2
(45) Date of Patent: Jun. 10, 2014

(54) METHOD FOR ATTACHING A SUPPORTING BEARING IN A STEERING RACK HOUSING FOR A POWER STEERING SYSTEM

(75) Inventors: Paul Hein, Solingen (DE); Alexander Kogan, Cologne (DE); Jens Keller, Solingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/608,290

(22) Filed: Sep. 10, 2012

(65) Prior Publication Data

US 2013/0239747 A1 Sep. 19, 2013

Related U.S. Application Data

(63) Continuation-in-part of application No. 13/242,119, filed on Sep. 23, 2011, now abandoned, which is a continuation of application No. PCT/EP2010/053711, filed on Mar. 22, 2010.

(30) Foreign Application Priority Data

Mar. 24, 2009 (DE) .......................... 10 2009 001 805

(51) Int. Cl.
*B21D 53/88* (2006.01)
*B23P 11/00* (2006.01)
*B23P 9/00* (2006.01)
*B23P 21/00* (2006.01)
*B21D 17/00* (2006.01)
*F16L 13/14* (2006.01)

(52) U.S. Cl.
USPC .......... 29/897.2; 29/432; 29/432.1; 29/432.2; 29/445; 29/469; 29/505; 29/506; 29/508; 29/510; 29/898.07; 72/370.21; 285/382.2; 403/285

(58) Field of Classification Search
USPC ............... 29/897.2, 28, 432, 432.1, 445, 469, 29/505, 506, 508, 510, 515, 522.1, 898.07, 29/898.11; 72/367.1, 368, 370.21; 74/388 PS; 180/428; 280/93.514, 280/93.515; 285/382, 382.1, 382.2; 384/191.4; 403/274, 283, 285
See application file for complete search history.

(56) References Cited

U.S. PATENT DOCUMENTS 3,453,831 A * 7/1969 Rusche .......................... 405/249
3,908,479 A 9/1975 MacDuff
(Continued)

FOREIGN PATENT DOCUMENTS

DE 4220415 A1 12/1993
EP 0147069 A2 7/1985
(Continued)

OTHER PUBLICATIONS

Machine Translation of DE 4220415 A1.*
(Continued)

*Primary Examiner* — Sarang Afzali
(74) *Attorney, Agent, or Firm* — Additon, Higgins, Pendleton & Ashe, P.A.

(57) ABSTRACT

A steering rack housing (20, 100, 100', 100") for a power steering system that surrounds a steering rack in a tubular manner and includes a hydraulic region (32), a mechanical region (34), and as an inner supporting bearing (38), wherein the supporting bearing is held in the steering rack housing (20, 100, 100', 100") by at least two cross-sectional contractions (46) of the housing.

6 Claims, 7 Drawing Sheets

(56) References Cited

U.S. PATENT DOCUMENTS

| | | | |
|---|---|---|---|
| 4,369,852 A | | 1/1983 | Nishikawa et al. |
| 4,574,610 A | * | 3/1986 | Hull et al. ................. 72/370.23 |
| 6,176,343 B1 | | 1/2001 | Vincent et al. |
| 6,644,430 B2 | | 11/2003 | Harer et al. |
| 7,258,035 B2 | | 8/2007 | Bieber |
| 2006/0037419 A1 | | 2/2006 | Osterlanger et al. |
| 2007/0193383 A1 | | 8/2007 | Toshima et al. |
| 2007/0296172 A1 | | 12/2007 | Gunther |
| 2011/0062677 A1 | | 3/2011 | Kudla et al. |

FOREIGN PATENT DOCUMENTS

| | | |
|---|---|---|
| EP | WO03/029067 A1 | 4/2003 |
| EP | 1777138 A1 | 4/2007 |
| EP | WO2010/108891 A1 | 9/2010 |

OTHER PUBLICATIONS

International Search Report of PCT/EP2010/053711 mailed Jun. 9, 2010; 3 pages.

* cited by examiner

METHOD FOR ATTACHING A SUPPORTING BEARING IN A STEERING RACK HOUSING FOR A POWER STEERING SYSTEM

This nonprovisional application is a continuation-in-part of U.S. Ser. No. 13/242,119 filed Sep. 23, 2011, now abandoned, in the U.S. Patent and Trademark Office and claims the benefit of commonly assigned International Application No. PCT/EP2010/053711, which was filed on Mar. 22, 2010, pending, which designates the U.S., and claims priority to German Patent Application No. DE 10 2009 001 805.0, which was filed in Germany on Mar. 24, 2009, and which are all herein incorporated by reference.

BACKGROUND OF THE INVENTION

The invention relates to a steering rack housing for a power steering system which surrounds a steering rack in a tubular manner and comprises at least a hydraulic region and a mechanical region as well as an inner supporting bearing.

Rack-and-pinion steering systems are used in motor vehicles for converting the rotating steering movement applied through the steering wheel into a rectilinear movement for pivoting the vehicle wheels to be steered. In this case, a servo drive, which can be disposed at suitable locations within the steering power train, is used for steering power assistance.

In the case of a rack-and-pinion steering system, the end of the steering column is connected to a pinion engaging the steering rack and laterally displacing it when the steering system rotates. A track rod is respectively connected to both ends of the steering rack through a ball joint. The extremely low wear has ensured the widespread use of the rack-and-pinion steering system. Rack-and-pinion steering systems have a good feedback and a very good resilience.

Usually, steering rack housings consist of aluminum and are manufactured by die casting. Machining is required after casting, for example in order to be able to mount the pinion unit on the steering rack housing; contact surfaces are also milled in for the parts to be mounted. Blind bores and through bores for attachment purposes are also produced.

However, steering rack housings made from steel are also known. Compared to the usual aluminum steering-gear housings, full-steel housings have a number of advantages including a higher rigidity and toughness of the material. The perceived steering precision is noticeably enhanced by the more rigid steel housing. Another advantage is the compact and cost-effective routing of hydraulic lines of the steel housing, in which the screw interfaces can be omitted. The housing, which can be flexibly adapted to different types of vehicle, is produced as a welded structure from formed pre-configured precision steel tubes with strengths, depending on the degree of forming, of 450 to 650 N/mm$^2$. A special galvanic coating ensures corrosion protection. The welded-on hydraulic supply lines enable an optimal adaptation to the construction space in the vehicle.

Steering rack housings comprise a mechanical region and a hydraulic region. The mechanical region is the region in which the region of the steering rack moves which is provided with teeth and which engages the pinion. The pinion engagement region is therefore located in the mechanical region of the steering rack housing. In contrast, the hydraulic region is the region into which the steering rack also extends but usually does not have any toothing. Within the hydraulic region, the steering rack is connected to a displaceably mounted piston member on each of whose end faces one cylinder chamber, respectively, is formed. When the steering wheel of the vehicle is turned, a control valve is actuated so that hydraulic oil flows into one of the cylinder chambers, respectively, whereby the piston and thus the steering rack are displaced in the cylinder. The displacement of the piston caused by the hydraulic oil serves as a force augmentation for the movement of the steering rack. To this end, the control valve and the steering rack housing are interconnected through hydraulic lines, so that, depending on the direction of rotation of the steering wheel, one or the other cylinder chamber can be filled with hydraulic oil or emptied.

A supporting ring or supporting bearing, which transmits the hydraulic internal forces into the steering rack housing and which generally also retains a sealing member, for example an O ring, is usually disposed between the mechanical region and the hydraulic region. In order to offer a point of force application to the supporting bearing, the steering rack housing has in this area a peripheral constricted portion which enables a positive fit with the supporting ring. The fabrication of the constricted portion entails relatively large efforts and correspondingly high costs.

BRIEF SUMMARY OF THE INVENTION

It is the object of the invention to reduce the production effort and the costs for a steering rack housing and still meet the demands with regard to quality and grades.

According to the invention, the object is achieved by a steering rack housing for a power steering system which surrounds a steering rack in a tubular manner and comprises at least a hydraulic region and a mechanical region as well as an inner supporting bearing, which is characterized in that the supporting bearing is held in the steering rack housing by at least two cross-sectional contractions of the housing.

Production of such a steering rack housing and the fastening of the supporting bearing within the steering rack housing are quick and simple to carry out. It is not necessary, according to the invention, to peripherally reduce the diameter of the entire steering rack housing; two cross-sectional contractions which are, if possible, diametrically opposed are sufficient. For this purpose, the supporting bearing, during attachment within the steering rack housing, is first brought to its functional position, then the cross section of the steering rack housing is changed from the outside with a corresponding tool. In a particularly advantageous process, it is sufficient, for example, to produce two punched-in portions from the outside. However, in order to further improve the attachment, three or more cross-sectional contractions uniformly distributed over the outer circumference of the steering rack housing can also be incorporated.

The cross-sectional contractions can be configured in such a way that they only clamp the supporting bearing within the steering rack housing; however, they may also effect attachment by means of a positive fit. A positive fit can be achieved, for example, when the cross-sectional contractions reach into depressions on the outside of the supporting bearing, i.e. the side that comes into contact with the inside of the steering rack housing. To this end, the supporting bearing may already be configured with corresponding depressions into which the cross-sectional contractions are pressed when the cross section is changed.

In a particularly advantageous manner, however, the force for incorporating the cross-sectional contractions is sufficient to modify or indent both the steering rack housing as well as the outer surface of the supporting bearing. For example, two or more mandrels can be pressed with high pressure into the outer surface of the steering rack housing, so that not only the steering rack housing itself, but also the supporting bearing is indented. This method is advantageous in that an exact positioning of the supporting bearing or of the depressions within the supporting bearing may be omitted.

The steering rack housing according to the invention for a steering system generally comprises a rectilinear passage, which defines two openings in the steering rack housing, for accommodating and displaceably mounting a steering rack reaching through the passage. In the invention, at least one stop provided on the side of the housing is provided according to another embodiment for limiting the displacement travel of the steering rack.

A "stop" within the sense of the invention is to be construed broadly. For example, the stop can cooperate directly with the steering rack, for example with a thickened portion provided thereon, and limit its displacement in one direction. Preferably, the stop is designed in such a way that during the displacement of the steering rack during steering, a joint part of the joint, for example ball joint, connecting the steering rack with the track rod contacts the stop in order thus to limit the displacement of the steering rack.

A preferred embodiment of the steering rack housing according to the invention is characterized in that the stop is provided by a stop part inserted into the passage and produced from steel sheet, or that the stop is formed on the steering rack housing. Advantageously, a conventional stop ring can thus be omitted. This saves weight and reduces not only the transport costs of the rack-and-pinion steering system, but also reduces the weight of the vehicle concerned and thus improves its energy balance. In addition, the production of the stop part with steel sheet or forming the stop on the housing is comparatively simple and can take place with few working steps, which reduces production costs. Moreover, the stop part produced from steel sheet can be connected to the housing with comparative ease by resistance welding, which reduces thermal stresses and thus the danger of deformation. The stop or stop part are not limited to the stopping function and can also additionally serve for supporting and guiding the steering rack.

Preferably, the stop is defined by a cross-sectional reduction of the passage of the steering rack housing, or the stop part defines a cross-sectional reduction.

In a particularly simple variation of the stop formed by the steering rack housing, the stop is formed by the passage, or its cross section, being so narrowly dimensioned over the entire length of the passage that a stop of the steering rack or the joint between the steering rack and the track rod occurs at the edge of the passage. In this embodiment, the steering rack housing advantageously does not require any further processing in order to produce the stop.

In another advantageous embodiment, the stop or the stop part is defined by a cross-sectional reduction of the passage of the steering rack housing which is symmetrical to the longitudinal axis of the passage. The stop can thus be provided with certainty, and above all, without the necessity of having to pay attention to an assembly direction during assembly.

In another advantageous embodiment, the stop or the stop part is disposed in the region of the opening of the passage of the steering rack housing, i.e., the stop or stop part is disposed on one of the two or on both opening regions of the steering rack housing. Generally, a steering rack housing has an opening region closest to the hydraulic region and an opening region closest to the mechanical region. Preferably, the stop or stop part is disposed at the opening region closest to the mechanical region, i.e. the steering rack housing of lower grade.

In one embodiment, the stop part of steel sheet is produced comparatively easily by sheet forming. Preferably, the stop part is produced by a deep drawing process. In order to avoid a preferred direction, which disadvantageously must be paid attention to during assembly, the stop part is configured to be rotationally symmetrical. Assembly errors are thus avoided. Preferably, the stop part is produced from a lower-grade steel sheet. Lower grade within the meaning of the invention for example denotes a grade that is lower than the grade of the steel of the at least one steel pipe defining the passage.

In one embodiment, the stop part is coherently connected with the steering rack housing, for example by pressing or against a stop; there is in that case a positive fit.

According to another advantageous embodiment, the stop part is bowl-shaped and formed with a central passageway for the steering rack.

In another advantageous embodiment, the stop formed by the housing is formed by cold forming, such as punching, of the steering rack housing.

According to another advantageous embodiment, the steering rack housing, in the region of the opening, has an outwardly widening, tulip-shaped appendage for attaching a sleeve, for example a joint sleeve of rubber. Preferably, the appendage is a deep-drawn part which, for example, is welded to the steel pipe. In one embodiment, the stop is formed by the tulip-shaped appendage.

The invention is explained further with reference to the following figures. The Figures are to be understood only as examples and merely represent preferred embodiments.

DETAILED DESCRIPTION OF THE INVENTION

A steering rack housing 20 according to the invention is configured to be substantially cylindrical. A steering rack, which is not shown, is located within the steering rack housing 20. The steering rack is moved via a pinion connected to the steering column. This pinion, which is also not shown, is disposed in a tower pipe 22. To this end, both the steering rack housing 20 as well as the tower pipe 22 comprise openings which in the mounted state are aligned and form a pinion engagement region.

Figure 1:
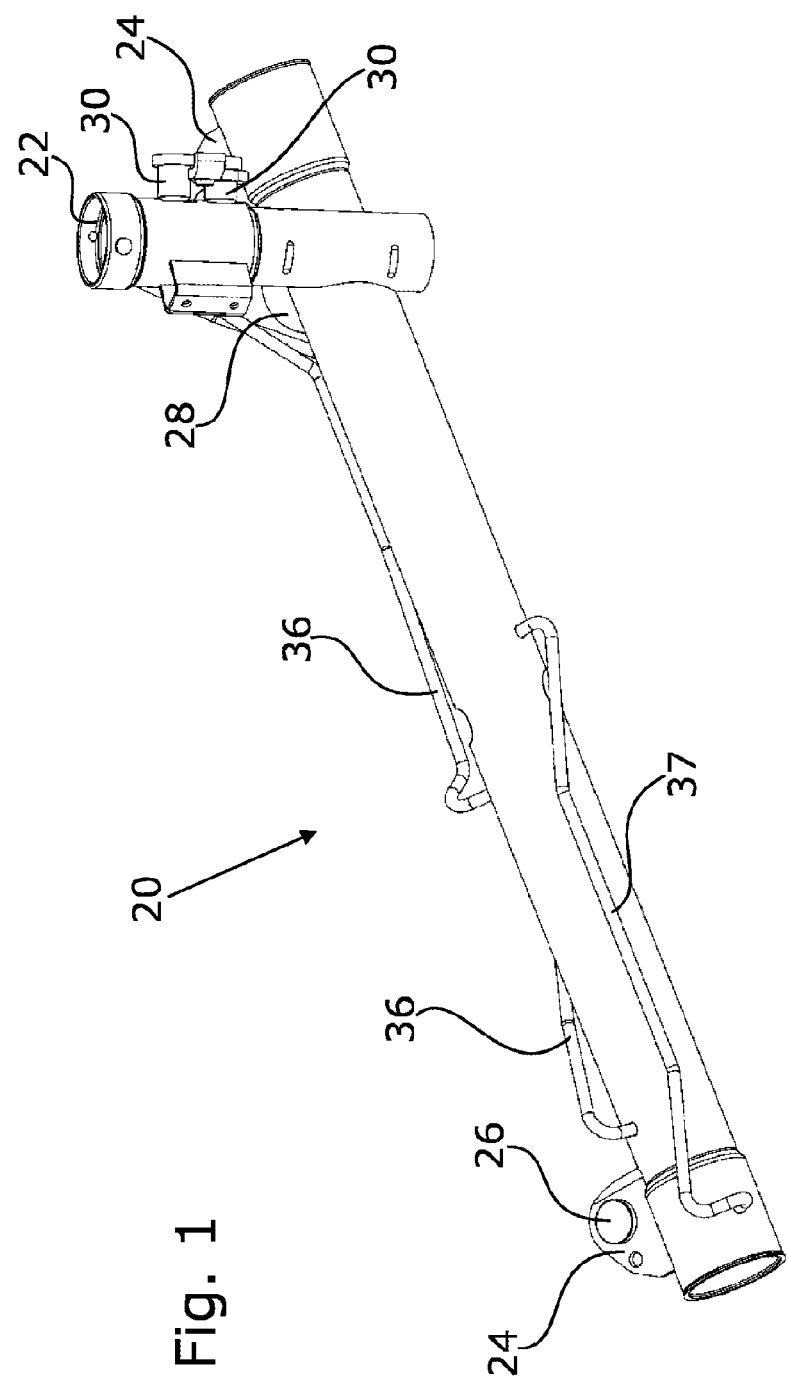
FIG. 1 shows a steering rack housing with associated components in a perspective view from the outside.

FIG. 1 further shows that the steering rack housing 20 has brackets 24 for attachment, which are respectively substantially disposed at the end and which comprise attachment openings 26.

On the side of the steering rack housing 20 opposite from the tower pipe 22, a sliding member tower 28 is disposed in which a sliding member, which is also not visible, is accommodated. In the exemplary embodiment shown, the tower pipe 22 comprises two supply sockets 30.

The tower pipe is additionally connected to the steering rack housing 20 via oil lines 36. The steering rack housing 20 comprises two regions, a hydraulic region 32 and a mechanical region 34 (also see FIG. 2). Furthermore, a venting line 37 is shown which connects the two steering rack housing regions 32, 34 with each other. The pinion engagement region is located in the mechanical region 34 in which the steering rack has a toothing. In the hydraulic region 32, the steering rack has no toothing but is connected to a displaceably mounted piston member. The piston divides the hydraulic region 32 into two cylinder chambers to each one of which one oil line 36, respectively, is connected. Via the tower pipe 22, the oil lines 36 are connected with a control valve, which is not shown, so that the piston is displaced in the desired direction through the corresponding oil pressure in the cylinder chambers, so that a power assistance for the steering system is ensured.

Figure 2:
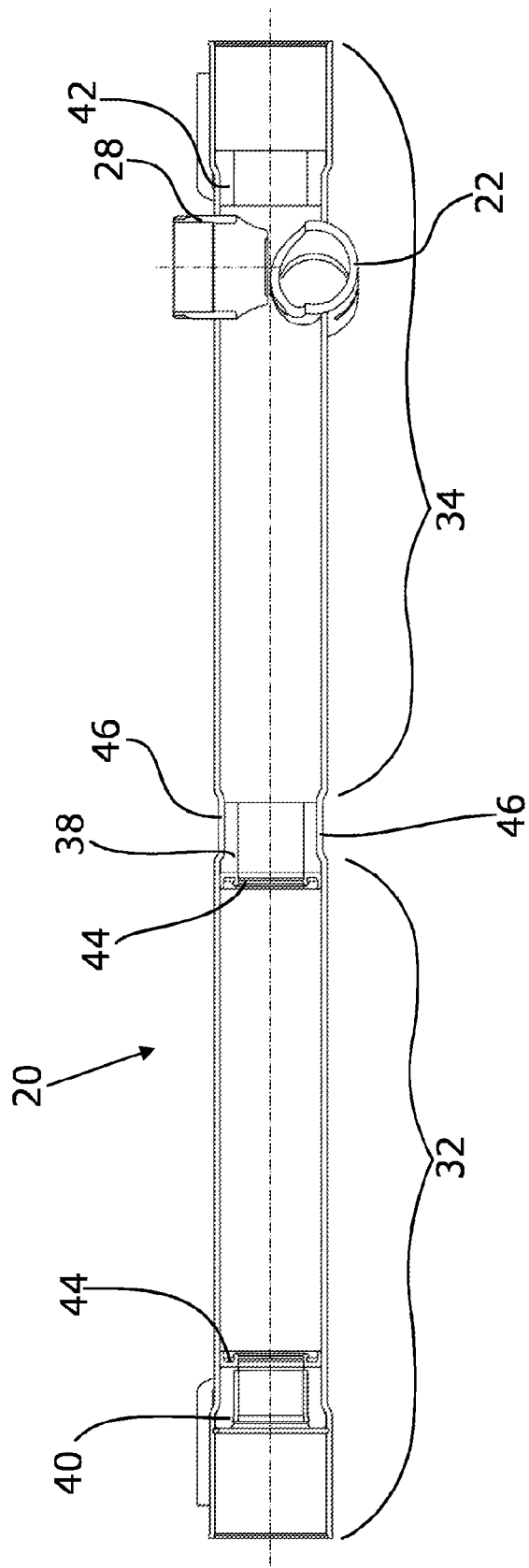
FIG. 2 shows the steering rack housing in a sectional view.

FIG. 2 shows a sectional view of the steering rack housing 20, whereby internal components are also visible. On its end, the hydraulic region 32 comprises a stop ring 40 for the piston of the steering rack, which is not shown, and the mechanical region 34 comprises on its end an additional bearing ring 42 for the other end portion of the steering rack. In the exemplary embodiment shown, the steering rack housing 20 is widened on its end and the bearing ring 42 is inserted in a positive fit. It transmits the compression force introduced by the steering rack onto the steering rack housing 20.

A supporting bearing 38 through which the steering rack extends can be seen in the approximate center of the steering rack housing 20. The supporting bearing 38 also serves as a stop for the piston of the steering rack. Sealing members 44 are disposed both on the supporting bearing 38 as well as on the stop ring 40 on the sides of the cylinder chambers.

Figure 3:
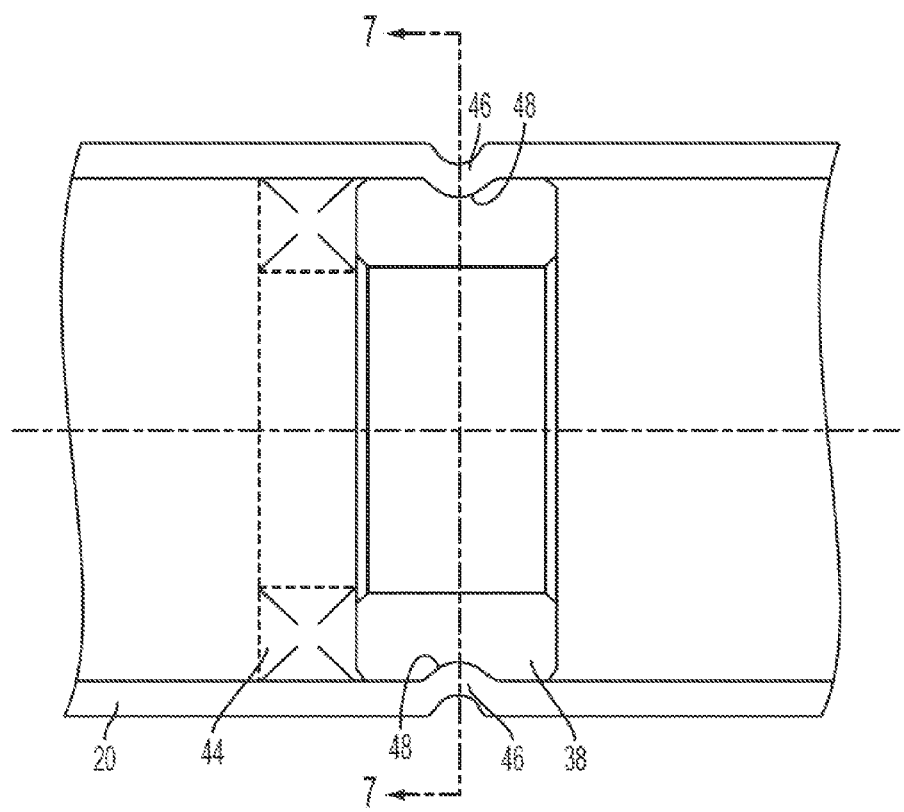
FIG. 3 shows a transitional region of the two-part steering rack housing.

In a detail enlargement, FIG. 3 illustrates the attachment of the supporting bearing 38 in the steering rack housing 20. Cross-sectional contractions 46 can be seen, which are configured as projections that protrude into the interior of the steering rack housing 20, into depressions 48 in the outer surface of the supporting bearing 38. The cross-sectional contractions 46 can be produced, for example, by a punching process in which the outer surface of the supporting bearing 38 is also punched in; thus, both the cross-sectional contractions 46 or projections as well as the depressions 48 are produced in only a single working step.

The invention makes it possible to considerably save costs in the production of steering rack housings 20. It is not necessary to provide the entire steering rack housing 20 with a continuous constriction; rather, a simple working step that can be quickly carried out is sufficient during production.

Figure 4:
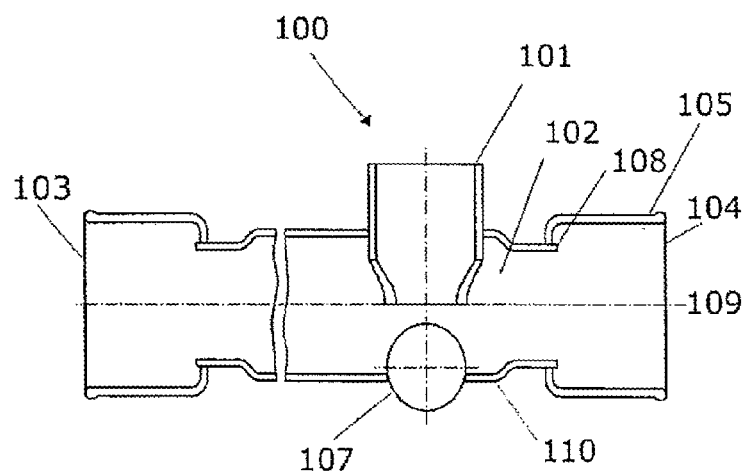
FIG. 4 shows an end adjacent to the mechanical region of an embodiment of the steering rack housing according to the invention in a sectional view.
Figure 5:
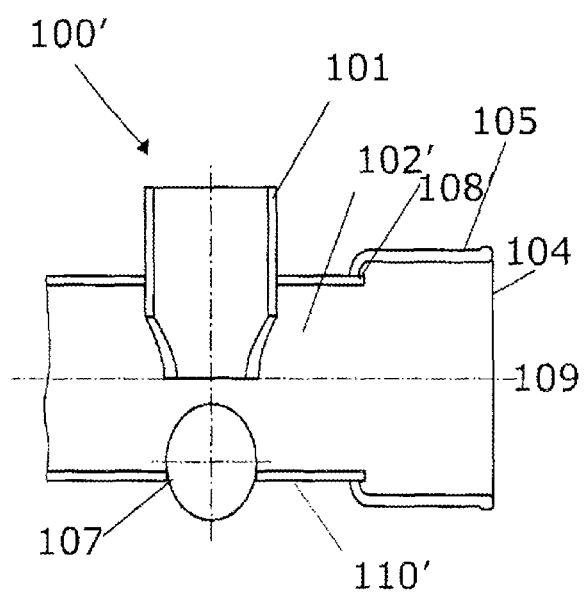
FIG. 5 shows an end adjacent to the mechanical region of an alternative embodiment of a steering rack housing according to the invention in a sectional view.
Figure 6:
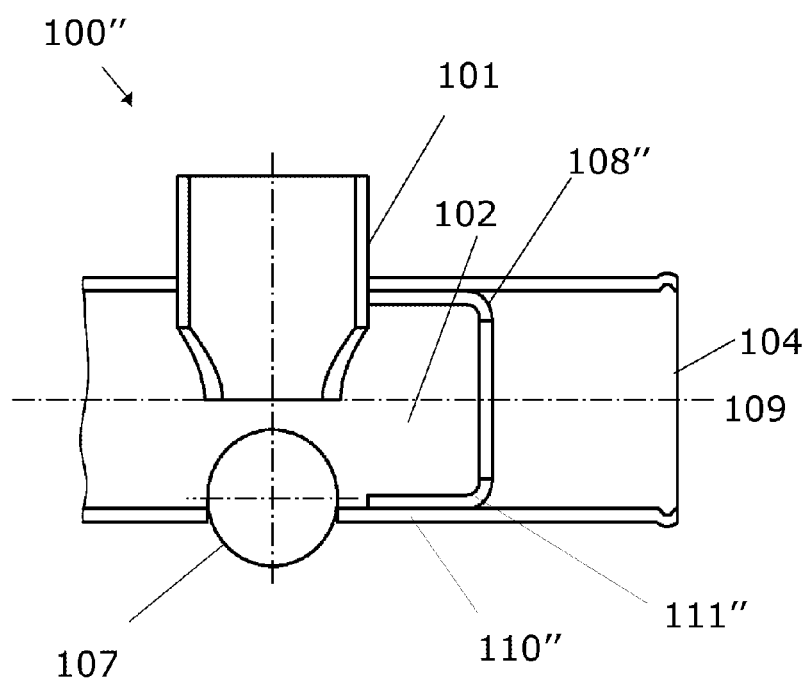
FIG. 6 shows an end adjacent to the mechanical region of another alternative embodiment of a steering rack housing according to the invention in a sectional view.

FIGS. 4 to 6 serve for illustrating the configuration of the stop according to the invention in a steering rack housing 100, 100', 100", as it can also be provided in the steering rack housing 20 shown in FIGS. 1 to 3. The steering rack housing 100 according to the invention comprises a rectilinear cylindrical passage 102 symmetrical to the longitudinal axis 109. It defines two openings, namely 103 and 104 depicted in FIG. 4. A steering rack, which is not shown, is located within the passage 102 of the steering rack housing 100 in the mounted state of the steering system. In the region of the two openings, i.e. also in the opening 104 shown, the housing comprises tulip-shaped appendages 105, 106 produced in a deep drawing process from steel sheet, which are welded onto the steel pipe 110 concerned.

As is clearly recognizable in FIG. 4, which shows a detailed view of the end of the steering rack housing 100 adjacent to the mechanical region, the steel pipe 110 comprises a cross-sectional reduction symmetrical to the longitudinal axis 109 of the passage 102, so that the edge forms the stop 108 against which a connecting joint between the steering rack and the track rod which is not shown can stop in order to limit the displacement travel of the steering rack. Thus, the stop 108 is formed, according to the invention, by the steering rack housing 100.

FIG. 5 shows an alternative embodiment of the steering rack housing 100' according to the invention. In this case, the steel pipe 110' has such a cross section that the edge, which is the result of the cross-sectional reduction from the tulip-shaped appendage 105 to the steel pipe 110', serves as a stop 108', which, according to the invention, is thus formed by the steering rack housing 100'.

FIG. 6 shows another alternative embodiment of the steering rack housing 100" according to the invention in which the stop 108" is provided by a stop part 111" inserted into the passage 102". The stop part 111", which is rotationally symmetrical about the longitudinal axis 109, is bowl-shaped and formed with a central passageway for the steering rack, and is produced in a deep drawing process from steel sheet. It is pressed into the steel pipe 110" and the edge around the central passageway 102" forms a cross-sectional reduction 108" which functions as a stop region.

Figure 7:
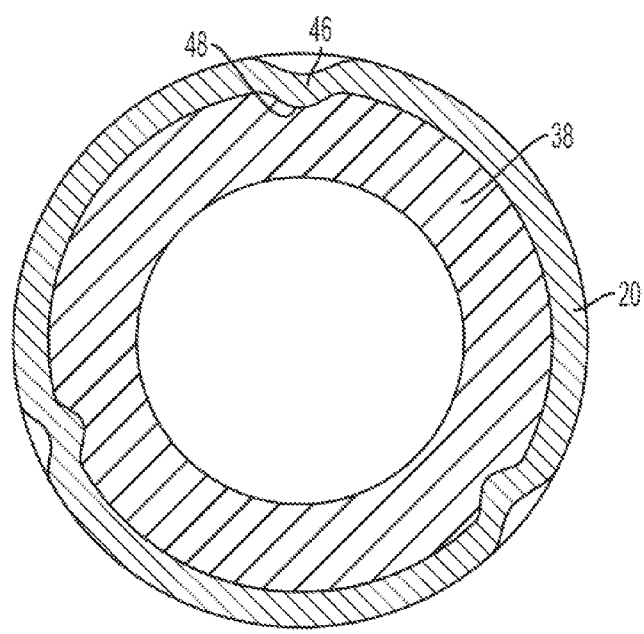
FIG. 7 shows a cross-sectional view of the invention taken along lines 7-7 of FIG. 3.

In order to further improve the attachment, three or more cross-sectional contractions 46 uniformly distributed over the outer circumference of the steering rack housing 20 can also be incorporated as depicted in FIG. 7. In one embodiment, three dents or contractions 46 may be positioned along the circumferential direction of the steering rack housing 20 with a 120° offset, as depicted in FIG. 7. As noted earlier, FIG. 7 depicts a cross-sectional view of FIG. 3 taken along lines 7-7.

FIG. 7 depicts the structure resulting from the force for incorporating the cross-sectional contractions that is sufficient to modify or indent both the steering rack housing 20 as well as the outer surface of the supporting bearing 38. For example, two or more mandrels can be pressed with high pressure into the outer surface of the steering rack housing 20, so that not only the steering rack housing itself, but also the supporting bearing 38 is indented as depicted in FIG. 7. In other words, the cross-sectional contractions extend into the surface of the steering rack housing 20 and the outer surface of the supporting bearing 38. This method is advantageous in that an exact positioning of the supporting bearing 38 or of the depressions 46 within the supporting bearing may be omitted.

The invention is not limited to the exemplary embodiments described but comprises, for example, all possibilities for connecting two steering rack housing portions to one another.

The invention claimed is:

1. A method for attaching a supporting bearing (38) in a steering rack housing (20, 100, 100', 100") for a power steering system, which surrounds a steering rack (30) in a tubular manner and comprises at least a hydraulic region (32) and a mechanical region (34), the method comprising the steps of:
   positioning the supporting bearing (38) at its functional position within the steering rack housing (20, 100, 100', 100"); and
   producing cross-sectional contractions (46) in the steering rack housing (20, 100, 100', 100") in the region of the supporting bearing (38) from the outside in such a way that the supporting bearing (38) is held firmly at its functional position;
   wherein a force for incorporating the cross-sectional contractions (46) as applied to one or more areas of the steering rack housing is sufficient to indent both the steering rack housing (20) as well as outer surfaces of the supporting bearing (38), thereby plastically deforming the housing and the bearing in a single action;

wherein the cross-sectional contractions (46) in the housing position the housing and support bearing substantially adjacent to one another to thereby reduce any motion of the support bearing separate and apart from the housing.

2. The method (20, 100, 100', 100") according to claim 1, wherein the cross-sectional contractions (46) are disposed diametrically opposite from one another.

3. The method (20, 100, 100', 100") according to claim 1, wherein at least three cross-sectional contractions (46) are provided which are radially disposed in a uniform manner and distributed over a circumference of the steering rack housing (20, 100, 100', 100").

4. The method (20, 100, 100', 100") according to claim 1, wherein the cross-sectional contractions (46) are formed by punched-in portions.

5. The method (20, 100, 100', 100") according to claim 1, wherein the cross-sectional contractions (46) hold the supporting bearing (38) in a clamping manner.

6. The method according to claim 1, wherein the cross-sectional contractions (46) hold the supporting bearing (38) by a positive fit by extending into depressions on an outer surface of the supporting bearing (38).

\* \* \* \* \*